United States Patent [19]
Kayatz et al.

[11] 3,731,397
[45] May 8, 1973

[54] CEMENT CLINKER COOLER

[75] Inventors: Karl-Heinz Kayatz, Hamburg-Nienstedten; Paul Schreiner, Papenwisch both of Germany

[73] Assignee: Fuller Company, Catasauqua, Pa.

[22] Filed: Oct. 14, 1970

[21] Appl. No.: 80,731

[30] Foreign Application Priority Data

Oct. 17, 1969  Germany............P 19 52 324.1

[52] U.S. Cl. .................................263/32 R, 34/164
[51] Int. Cl. ..............................................F27b 7/38
[58] Field of Search .......................34/164; 263/32

[56] References Cited

UNITED STATES PATENTS

| | | | |
|---|---|---|---|
| 2,994,521 | 8/1961 | Azbe | 263/32 R |
| 2,137,363 | 11/1938 | Spreuger | 263/32 R |
| 3,092,473 | 6/1963 | Koontz et al. | 34/164 |

Primary Examiner—John J. Camby
Attorney—Jack L. Prather and Frank H. Thomson

[57] ABSTRACT

Cement clinker cooler apparatus which includes a pair of grate type clinker coolers with opposite working directions. The hot clinker from the kiln is deposited on a distributor which directs the clinker in desired proportions to the two coolers. The distributor is adjustable to control the proportion of clinker supplied to each cooler. Several distributor configurations are disclosed.

8 Claims, 6 Drawing Figures

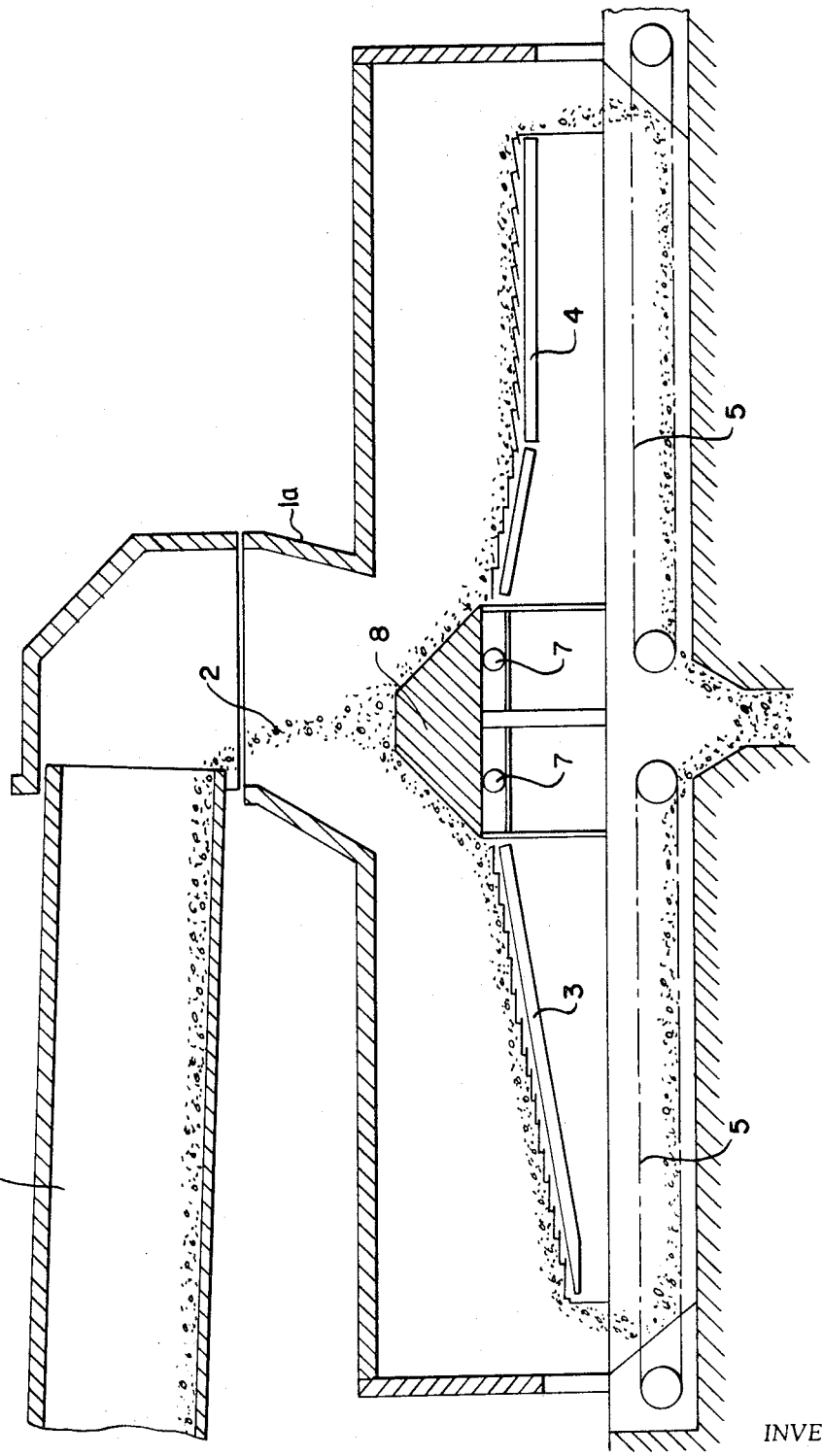

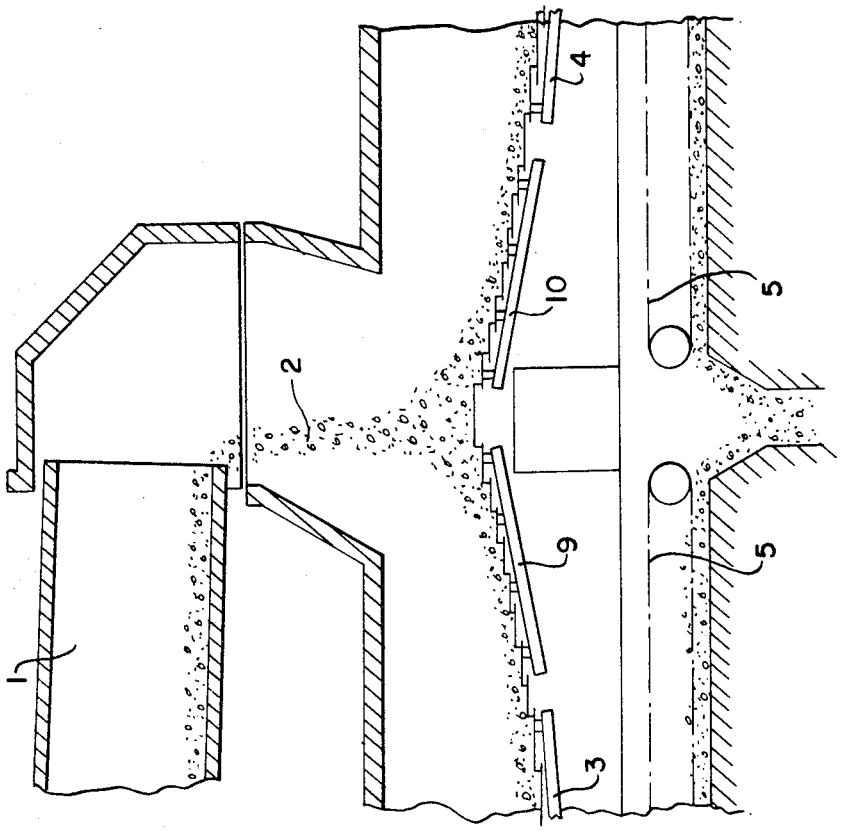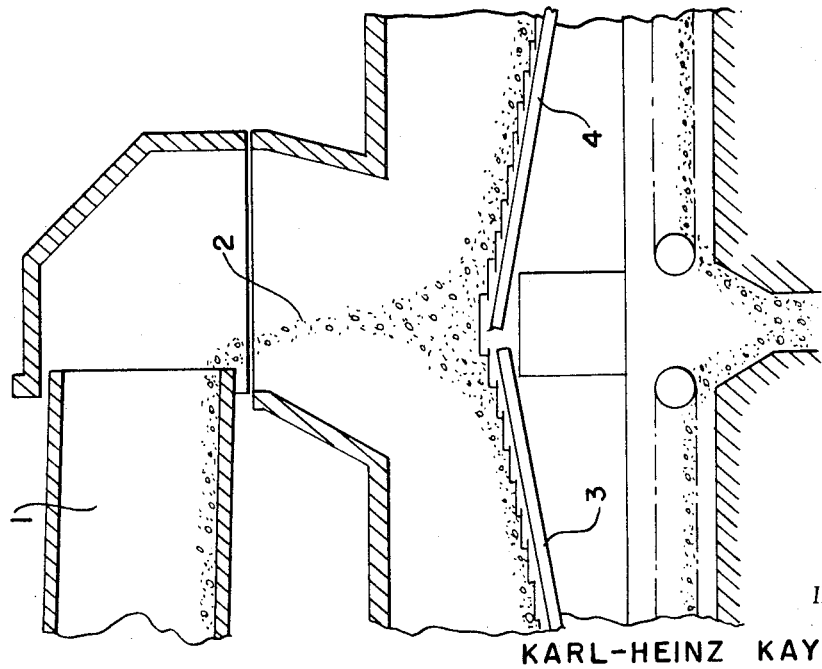

PATENTED MAY 8 1973 3,731,397

INVENTORS
KARL-HEINZ KAYATZ &
PAUL SCHREINER

BY Frank H Thomson
Jack L. Prather
ATTORNEY 3,731,397

CEMENT CLINKER COOLER

BACKGROUND OF THE INVENTION

This invention relates to cement clinker coolers and in particular to a cement clinker cooler arrangement which employs a pair of grate type clinker coolers.

In cement production facilities, the trend of development has been to larger capacities which requires constantly growing installation components, including furnaces and clinker coolers.

Heretofore, there has been a limitation on the size of the clinker coolers. If the coolers are too big, difficulties may occur in the distribution of the material to be cooled and in the regulation of the cooler; the design and production of the cooler are not easy to master in terms of material, and in particular there is a rise in the operational breakdown risk because, if the cooler breaks down, it is necessary to idle large capacities. In addition, the shutdown of the furnace and the restarting of the furnace can damage the brick lining of the furnace.

The invention is therefore intended to create a clinker cooler which will not have these disadvantages in spite of its large capacity. The invention provides a cooler which can be easily kept under control in terms of design and operation, and in which the operational breakdown risk will be small.

The solution according to the invention consists in the fact that two coolers with differing working directions are connected to the furnace output.

Among the advantages of the design according to this invention is that it offers great operational reliability inasmuch as, if one of the coolers should break down, the plant could continue operations with the other cooler with a reduced kiln output. The present invention can prevent the need for shutting down the furnace and the need for having to start it up again with all of the consequences that are so dangerous to the brick lining of the furnace. In addition, the double-cooler, according to the invention, can be more easily adapted to the particular conditions prevailing at the particular site in terms of arrangement and space requirement, especially if the smaller, older installations are to be replaced with modern, larger installations.

The present invention has a particularly favorable arrangement in terms of material charging and space-saving layout if the two coolers are arranged in opposite working directions, whereby one of the two coolers is effectively positioned below the furnace with a working direction opposite to the furnace.

According to the invention, both coolers can be grate coolers with joint charge devices, whereby at the joint charging point of the two coolers, a device for the arbitrary distribution of the charged material over the two coolers is provided. According to this invention, this device can be a distributor body which is adjustable in the longitudinal direction of the two coolers. By a distributor body in this connection is meant a body arranged above the beginning of the two cooling grates, or, a body from which the material slides off toward both grates. For this purpose, it can be provided with corresponding inclined surfaces. In its simplest form, it consists of a plate on which the charged material slopes off toward both sides. A body with a trapezoidal cross-section is considered more advantageous; on the horizontal surface of this body, a small volume of material will pile up and slope off in order then to slide off on the lateral inclined surfaces of the body. The longitudinal attachment of the distributor body determines the ratio in which the material reaches one and the other cooler.

In another version, the device for the distribution of the material can consist of relatively short distributor grates which can be driven with differently adjustable speed.

In each case, the distributor device is to be so adjustable that the entire material is supplied exclusively to one or the other cooler. Of course, instead of this, special diversion flaps can be provided which are so adjustable that the entire material will reach one of two coolers, in which case this job need not be done by the distributor installation.

SUMMARY

It is, therefore, the principal object of this invention to provide a material cooling arrangement which permits the continued operation of a furnace from which hot material is discharged.

It is a further object of this invention to provide a double cooler arrangement with each cooler receiving a portion of the material to be cooled.

It is a still further object of this invention to provide distributor means for proportionately directing material to be cooled to more than one material cooling apparatus.

In general, the foregoing and other objects will be carried out by providing apparatus for cooling material which has been heated in a furnace comprising means for receiving heated material from a furnace; at least a pair of cooler means flow connected to said means for receiving heated material; and distributor means for distributing heated material to each of said cooler means.

BRIEF DESCRIPTION OF THE DRAWINGS

The invention will be described in connection with the annexed drawing wherein:

FIG. 1 is a schematic longitudinal cross-section through a rotary kiln with two grate coolers attached;

FIGS. 2 and 3 in each case represent the central part of a similar installation with an altered distributor device;

FIG. 4 shows a distributor unit consisting of two differently adjustable distributor grates.

FIG. 1 shows the discharge end of a rotary kiln 1, from which hot cement clinker 2 is discharged into a conduit 1a. A pair of grate coolers 3 and 4 are flow connected to the conduit 1a. The coolers 3 and 4 may be of the type shown in U.S. Pat. No. 2,163,513 wherein a plurality of grates carry material down an incline and cooling air is blown through the hot cement clinker. The air heated by the hot clinker is returned to the kiln.

The cooler 3 is positioned below the rotary kiln 1 but in opposite working direction in comparison to the kiln. On the other hand, the cooler 4 is shifted by 180° with respect to cooler 3, has the same working direction as the rotary kiln. The clinker streams of the two coolers are brought together again below the coolers by known conveyor devices 5 toward the middle or to some other place and the clinker further treated in the usual manner.

During normal operation, both coolers should normally have the same output and performance. They must therefore be charged with the same volume of clinker. If, as can be seen in FIG. 2, the two coolers start from the same charging point, without devices being provided for uniform distribution, then this same output performance will not be guaranteed in every case. In order to achieve identical output performance, an adjustable distributor device is arranged at the common charging point of the two coolers.

Figure 3:
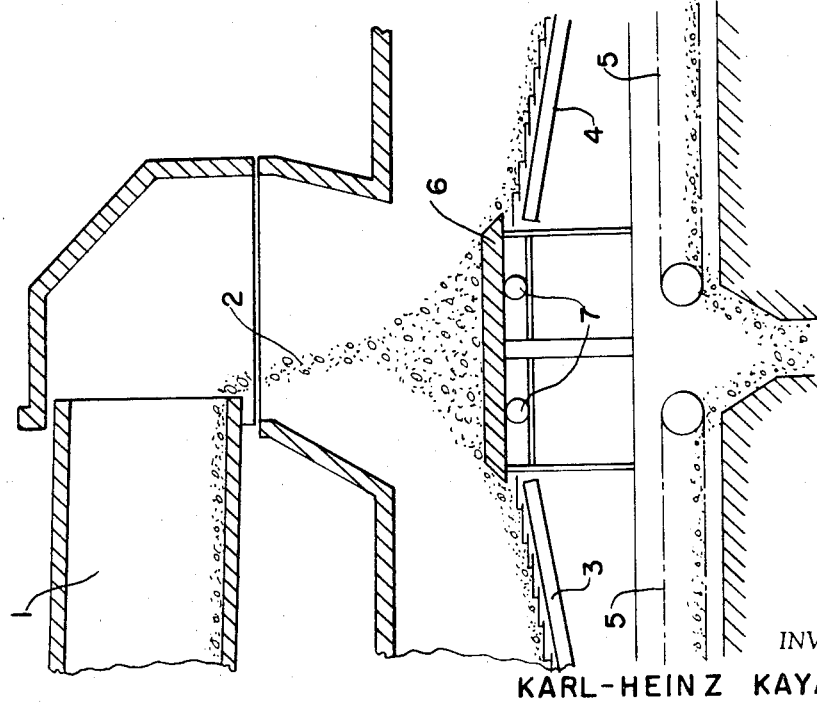

The simplest form of this distributor device is shown in FIG. 3. There it assumes the shape of a plate 6, which can be adjusted in the longitudinal direction, that is, in the common direction of the two clinker coolers by any suitable means such as a fluid pressure operated piston cylinder arrangement (not shown). Adjustability is indicated by two rollers 7. By means of a corresponding adjustment of the plate, the material will be evenly sloped toward both sides and the same amount of material can be supplied to both coolers. Likewise, by accordingly adjusting the plate, we can, if we so desire, adjust for the uneven charging of the two coolers.

The distributor device 8, illustrated in FIG. 1, has a trapezoidal cross-section. The effect is essentially the same as that of the plate. By suitably moving the body 8, the entire material will fall on one of the two inclined surfaces, so that all of the material will be supplied to only one of the two coolers. This may become necessary when the operation of the other cooler is disturbed, for example, due to damage to the grate plates, and when this cooler must be shut down. In such a case, the entire operation can be kept going at half the capacity. If an installation with just one cooler were to break down, the furnace would have to be shut down.

FIG. 4 shows a distributor device in the form of two comparatively short distributor grates 9 and 10 connected in a head of the main cooling grates 3 and 4; each of these distributor grates can be driven at a speed differing in comparison to the other one. Since these short distributor grates can be driven at different speeds, a uniform distribution of the material over the width of the cooling grate can be achieved.

Figure 5:
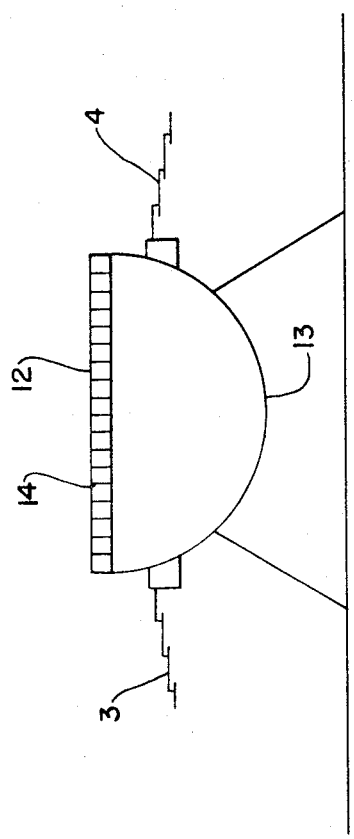
FIGS. 5 and 6 show a schematic cross-section view and top view, respectively, of another form of this invention.
Figure 6:
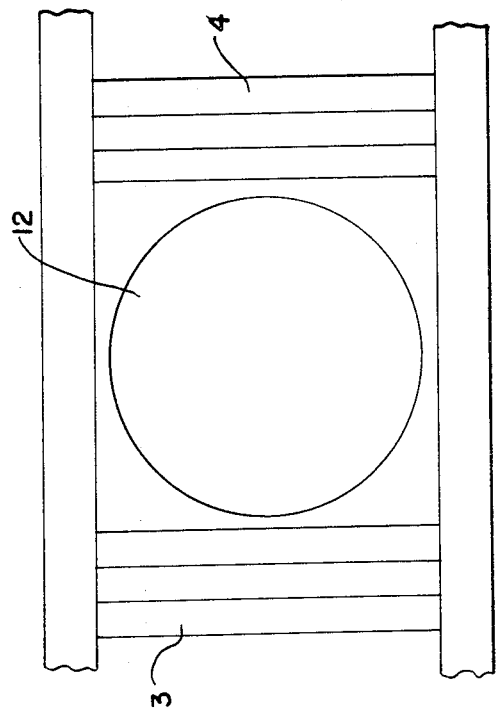

FIGS. 5 and 6 show a distributor device consisting of a table 12 whose surface can be coated with a ceramic material and can also be adjusted in an inclined manner in addition to its horizontal adjustment. The adjustability of the table is assured, for example, by an under-surface 13 in the form of a spherical segment which must be visualized as resting upon supports which facilitate the desired adjustment. For example, the spherical segment can rest on a fixed plate with a ring or a cutout. The segment should be capable of being moved in any direction so that the clinker distribution both in the direction of transportation and in the direction of the width of the cooler can be controlled. The movement of the hemisphere can take place, for example, in, respectively, under its movably arranged hydraulic cylinder (not shown).

In addition to such a hemispherical design, other adjustment possibilities can be considered. For example, the table, which may have any shape on the under-side, can rest on several supports which can be so adjusted in terms of their height, individually or in groups, so that the table can be given the desired inclination with respect to the horizontal.

If it suffices to adjust the inclination of the table in the direction of the coolers, then the hemispherical design on the under-side can be replaced by a semicylindrical one, whereby the cylinder axis runs laterally to the cooler direction. This design can in turn, be replaced with other desired designs which facilitate the corresponding tipping of the table. For example, the table may be positioned in such a manner that it can be tipped around a lateral axis, whereby adjustable devices are present for the purposes of stopping and, if necessary, supporting the table in any position that might come under consideration.

It is intended that the foregoing be merely a description of the preferred embodiment and that the invention be limited solely by that which is within the scope of the appended claims.

We claim:

1. Apparatus for cooling material which has been heated in a furnace comprising:
   means for receiving heated material from a furnace;
   at least a pair of independently operable cooler means flow connected to said means for receiving heated materials; and
   distributor means for distributing heated materials to each of said cooler means, said distributor means having the capacity to supply up to the total quantity of heated material to any one of said cooler means.

2. The apparatus of claim 1 wherein there are two grate coolers having opposite working directions to thereby define a pair of cooler means.

3. The apparatus of claim 2 wherein said distributor means includes a distributor body which is adjustable in the longitudinal direction of the coolers.

4. The apparatus of claim 3 wherein said distributor body is trapezoidal in configuration; and said apparatus further comprises means for moving said distributor relative to said means for receiving said heated material to thereby provide the capacity to supply up to the total quantity of heated material to any one of said cooler means.

5. The apparatus of claim 2 wherein said distributor means includes a pair of distributor grates, each mounted in one of said coolers and capable of being operated at different speeds.

6. The apparatus of claim 2 wherein said distributor means includes a table capable of being adjustably inclined.

7. The apparatus of claim 6 wherein said table is mounted on a spherical base to provide means for adjusting the inclination of said table.

8. The apparatus of claim 6 wherein said table is mounted on a cylindrical base to provide means for adjusting the inclination of said table.

* * * * *